(12) United States Patent
Thayer et al.

(10) Patent No.: US 8,376,721 B2
(45) Date of Patent: Feb. 19, 2013

(54) TURBINE HEAT SHIELD ASSEMBLY

(75) Inventors: Michael Thayer, Asheville, NC (US);
Marc Ogle, Swannanoa, NC (US)

(73) Assignee: BorgWarner Inc., Auburn Hills, MI (US)

( * ) Notice: Subject to any disclaimer, the term of this patent is extended or adjusted under 35 U.S.C. 154(b) by 732 days.

(21) Appl. No.: 12/444,742

(22) PCT Filed: Oct. 30, 2007

(86) PCT No.: PCT/US2007/082984
§ 371 (c)(1),
(2), (4) Date: Apr. 8, 2009

(87) PCT Pub. No.: WO2008/057846
PCT Pub. Date: May 15, 2008

(65) Prior Publication Data
US 2010/0043431 A1 Feb. 25, 2010

Related U.S. Application Data

(60) Provisional application No. 60/863,865, filed on Nov. 1, 2006.

(51) Int. Cl.
*F04B 17/00* (2006.01)
(52) U.S. Cl. .......................................... 417/360; 417/366
(58) Field of Classification Search ................... 417/360, 417/366–368, 373, 410.1, 411, 423.8, 423.11–423.13
See application file for complete search history.

(56) References Cited

U.S. PATENT DOCUMENTS

| 4,907,952 | A | * | 3/1990 | Inoue et al. | 417/407 |
|---|---|---|---|---|---|
| 4,969,805 | A | * | 11/1990 | Romeo | 417/360 |
| 5,028,208 | A | * | 7/1991 | Mitsubori et al. | 415/150 |
| 5,161,960 | A | * | 11/1992 | Smith | 417/407 |
| 5,210,945 | A | * | 5/1993 | Suzuki | 29/889.21 |
| 5,403,150 | A | * | 4/1995 | McEachern et al. | 415/177 |
| 5,441,383 | A | * | 8/1995 | Dale et al. | 415/158 |
| 5,839,281 | A | | 11/1998 | Sumser et al. | |
| 5,890,881 | A | * | 4/1999 | Adeff | 417/407 |
| 6,145,313 | A | * | 11/2000 | Arnold | 60/605.2 |
| 6,464,034 | B1 | * | 10/2002 | Toda et al. | 180/444 |
| 7,097,432 | B1 | | 8/2006 | Lombard et al. | |
| 2003/0170116 | A1 | * | 9/2003 | Knauer et al. | 415/160 |

(Continued)

FOREIGN PATENT DOCUMENTS

| EP | 1353045 A1 | 10/2003 |
|---|---|---|
| JP | 63-118338 U | 7/1988 |

(Continued)

OTHER PUBLICATIONS

English translation of Japanese Office Action dated Dec. 27, 2011.

*Primary Examiner* — Anh Mai
(74) *Attorney, Agent, or Firm* — William G. Anderson; Stephan A. Pendorf; Patent Central LLC

(57) ABSTRACT

A turbocharger is provided having a bearing housing (100) and a heat shield (200) staked thereto. The staking process can be a compression staking process that deforms one or more portions of the bearing housing (100). The bearing housing (100) can have an annular channel (150) and the compression staking can be done to an outer edge (160) of the annular channel (150) to form one or more compression projections (400). The size and shape of the annular channel (150) can be substantially the same as the size and shape of an outer portion of the heat shield (200) to allow for a press-fit therebetween.

9 Claims, 4 Drawing Sheets

U.S. PATENT DOCUMENTS

2003/0170117 A1* 9/2003 Knauer et al. ............... 415/160
2006/0225419 A1* 10/2006 Prusinski et al. ........... 60/605.1

FOREIGN PATENT DOCUMENTS

| | | |
|---|---|---|
| JP | 01-134025 A | 5/1989 |
| JP | 1134025 A | 5/1989 |
| JP | 07-189724 A | 7/1995 |
| JP | 2003227344 A | 8/2003 |
| JP | 2003-307105 A | 10/2003 |
| JP | 2004-504524 A | 2/2004 |
| KR | 1020030029785 A | 4/2003 |

* cited by examiner

TURBINE HEAT SHIELD ASSEMBLY

FIELD OF THE INVENTION

This invention is directed to a turbocharging system for an internal combustion engine and more particularly to assembly of components of the turbocharger.

BACKGROUND OF THE INVENTION

Turbochargers are a type of forced induction system. They compress the air flowing into an engine, thus boosting the engine's horsepower without significantly increasing weight. Turbochargers use the exhaust flow from the engine to spin a turbine, which in turn drives an air compressor. Since the turbine spins about 30 times faster than most car engines and it is hooked up to the exhaust, the temperature in the turbine is very high. Additionally, due to the resulting high velocity of flow, turbochargers are subjected to noise and vibration. Such conditions can have a detrimental effect on the components of the turbocharger, particularly on the rotating parts such as the turbine rotor, which can lead to failure of the system. Additionally, thermal growth or expansion due to the temperature changes must be designed for which can lead to inefficencies as a result of unwanted gaps under certain conditions.

Turbochargers are in use in connection with laree diesel engines as well as with smaller, passenger car power plants. The design and function of turbochargers is described in detail in the prior art, for example, U.S. Pat. Nos. 4,705,463, 5,399,064, and 6,164,931, the disclosures of which are incorporated herein by reference.

Turbocharger units typically include a turbine operatively connected to the engine exhaust manifold, a compressor operatively connected to the engine air intake manifold, and a shaft connecting the turbine wheel and compressor wheel so that the rapidly rotating turbine wheel drives the compressor wheel. The shaft extends through a bearing housing and is mounted for rotation in bearings. The bearings are most often free-floating bearings. Crankcase lubricant under pressure is pumped through the free floating bearings to lubricate the rotating bearing interfaces, as well as the thrust surfaces that limit axial excursions of the shaft.

In addition to performing the useful work as described above, turbochargers must be designed to combat two significant problems: first, oil should not be allowed to escape from the bearing housing into the turbine or compressor housing, and from there into the environment, and second, the high temperature of the turbine must not be allowed to adversely affect the lubricating oil in the bearing housing.

More specifically, turbocharged vehicles are required to meet increasingly stringent emissions standards. It is a challenge to contain lubricant within the bearing housing, considering that lubricating oil is pumped in under pressure, at a high flow rate, to lubricate and remove heat from a turbine shaft which extends through the turbine housing and rotates at up to 350,000 rpm. Although barriers are set up in the turbocharger, some amount of the lubricant will escape from the bearing housing into either the turbine housing or the compressor housing. This lubricant is ultimately emitted into the environment via the exhaust, contributing to emissions.

Regarding the second mentioned problem, temperatures of about 740° C. occur in the exhaust gas turbine in the case of diesel engines and about 1,000° C. in the case of Otto-cycle engines. The transfer of high temperatures from the turbine portion of the turbocharger to the bearing housing can lead to oxidation of the lubricating oil within the bearings and on the walls of the center housing.

It is known to use heat shields in order to protect the bearing housing from the high temperatures of the exhaust gas turbine. Heat shields are described for example in U.S. Pat. Nos. 4,613,288; 4,969,805; 5,026,260; 5,214,920; 5,231,831; and 5,403,150. According to conventional wisdom, the heat shield is a piece of metal in the shape of a flat disc interposed between the turbine and bearing housing and able to withstand exposure to high temperatures. Where variable geometry guide vanes are used by the turbocharger, the positioning of the heat shield must be such so as not to interfere with movement of the vanes or the turbine wheel, even with thermal growth of the components of the turbocharger.

In U.S. Pat. No. 7,097,432 to Lombard, a VTG turbocharger is shown having a heat shield mounted between a turbine housing and a center housing. The Lombard device is shown in FIGS. 1 and 2 and has a turbine housing 12, a center housing 14 a compressor lousing 16, a turbine wheel 18, housing bolts 40, rotatable guide vanes 90 and a heat shield 92. The heat shield 92 is mounted concentrically with the turbine wheel 18 by being clamped or sandwiched along a periphery thereof by the turbine and center housings 12 and 14. The housing bolts 40 apply compression to maintain the heat shield 92 in place during operation of the turbocharger. The Lombard assembly, while typical of heat shield assemblies for turbochargers, can suffer from the drawback of movement of the heat shield 92 with thermal growth of the turbine housing 12. Additionally, to account for thermal growth and assembly tolerances when positioning the heat shield 92 in between the housings 12 and 14 so that the turbine wheel 18 and guide vanes 90 have adequate clearance, larger gaps are provided which can decrease the efficiency of the turbocharger.

Additionally, where a turbocharger assembly seeks to integrate the housings to eliminate the clamping joint, other connection means becomes necessary. Additional components, such as connection structures. e.g., bolts, are costly and can be subject to failure over time due to the extreme conditions that the connection structures are subjected to.

Thus, there is a need for a heat shield assembly for improved connection with the turbine and/or bearing housing. There is a further need for such an assembly that accounts for thermal growth of the housing and/or vane ring assembly while maintaining efficiencies. There is a yet a further need for such a system and method that is cost effective and dependable. There is additionally a need for such a system and method that facilitates manufacture, assembly and/or disassembly.

SUMMARY OF THE INVENTION

The exemplary embodiment of the turbocharger assembly provides an improved connection of the heat shield with the turbine and/or bearing housing. The exemplary embodiment accounts for thermal growth of the housing and/or vane ring assembly while maintaining efficiencies. The exemplary embodiment is cost effective and dependable. The exemplary embodiment facilitates manufacture, assembly and/or disassembly.

In one aspect, a turbocharger is provided comprising a bearing housing; a turbine wheel; a shaft with a lubrication system; and a heat shield isolating the turbine wheel from the lubrication system. The heat shield is connected to the bearing housing by at least one connecting projection. The at least one connecting projection is formed by a process of deformation of the bearing housing.

In another aspect, a turbocharger is provided comprising: a bearing housing having an annular channel therein; a turbine wheel; and a heat shield positioned between the turbine wheel and the bearing housing. A portion of the heat shield is positioned in the annular channel and the heat shield is connected to the bearing housing by at least one connecting projection. The at least one connecting projection is formed by a process of deformation of the bearing housing.

In another aspect, a method of assembling a turbocharger is provided comprising: positioning a heat shield between a bearing housing and a turbine wheel thereby isolating a lubricating system from the turbine wheel; and deforming at least one portion of the bearing housing by compression staking thereby forming at least one connecting projection. The at least one connecting projection presses against the heat shield.

The bearing housing can have a channel and a portion of the heat shield can be positioned in the channel. The heat shield may be an annular flange which is positioned in the channel. The at least one connecting projection can be a plurality of connecting projections that are equi-distantly spaced along a circumference of the heat shield. The process of deformation of the bearing housing may be performed by a staking tool having one or more compression stakes thereon. The at least one connecting projection can be formed from a deformation of an outer edge of the channel. The size and shape of the annular flange can be substantially the same as the size and shape of the channel.

The heat shield can have a center hole and an inner wall that is tapered towards the center hole. The heat shield may be concentrically aligned with the turbine wheel. The at least one connecting projection can be a plurality of connecting projections that are equi-distantly spaced along a circumference of the heat shield. The method can further comprise press-fitting the heat shield into an annular channel of the bearing housing prior to compression staking the bearing housing. The method may further comprise positioning the heat shield into an annular channel of the bearing housing prior to compression staking the bearing housing and deforming an outer edge of the annular channel by the compression staking to form the at least one connecting projection.

BRIEF DESCRIPTION OF THE DRAWINGS

The present invention is illustrated by way of example and not limitation in the accompanying drawings, in which like reference numbers indicate similar parts, and in which.

DETAILED DESCRIPTION OF THE INVENTION

Figure 1:
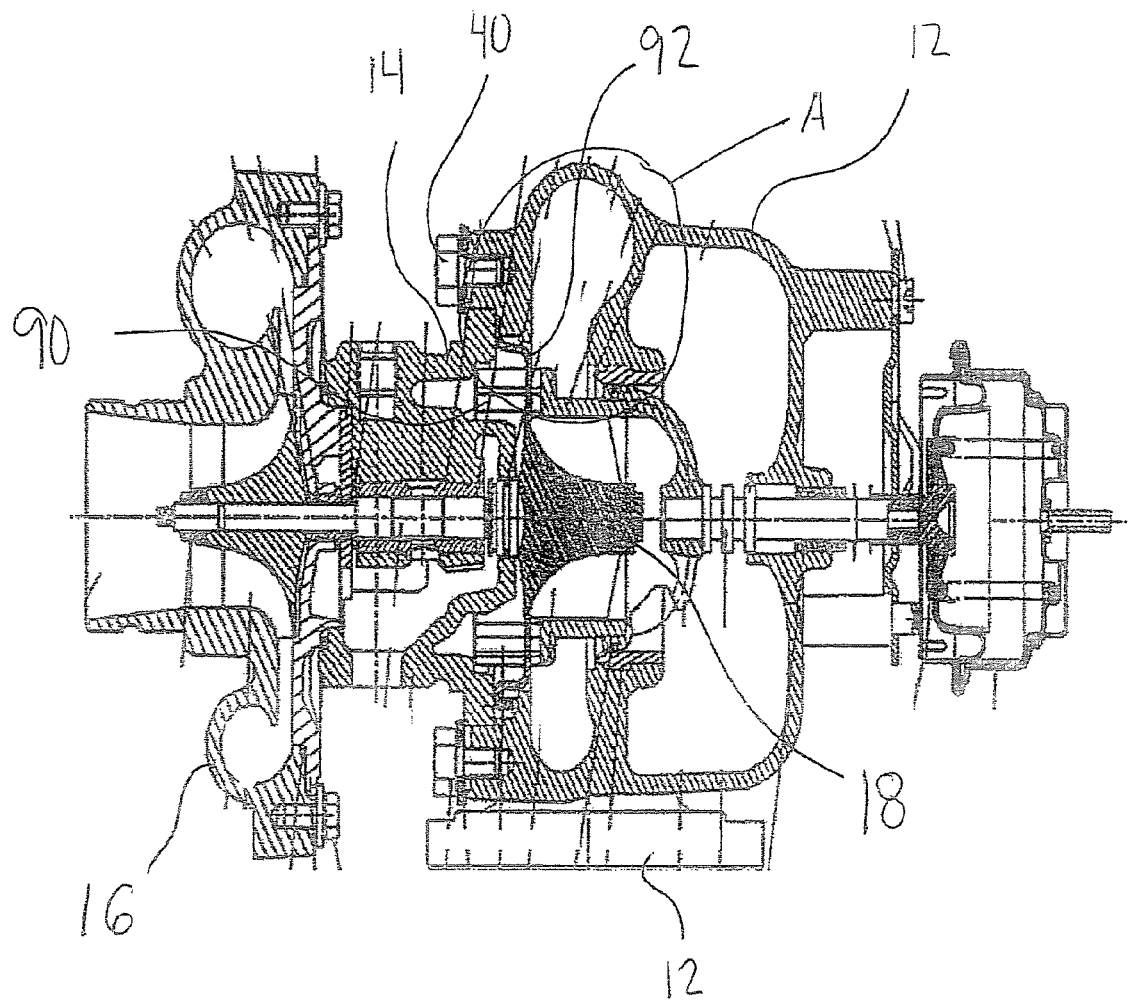
FIG. 1 is a cross-sectional view of a contemporary turbocharger system according to U.S. Pat. No. 7,097,432.
Figure 2:
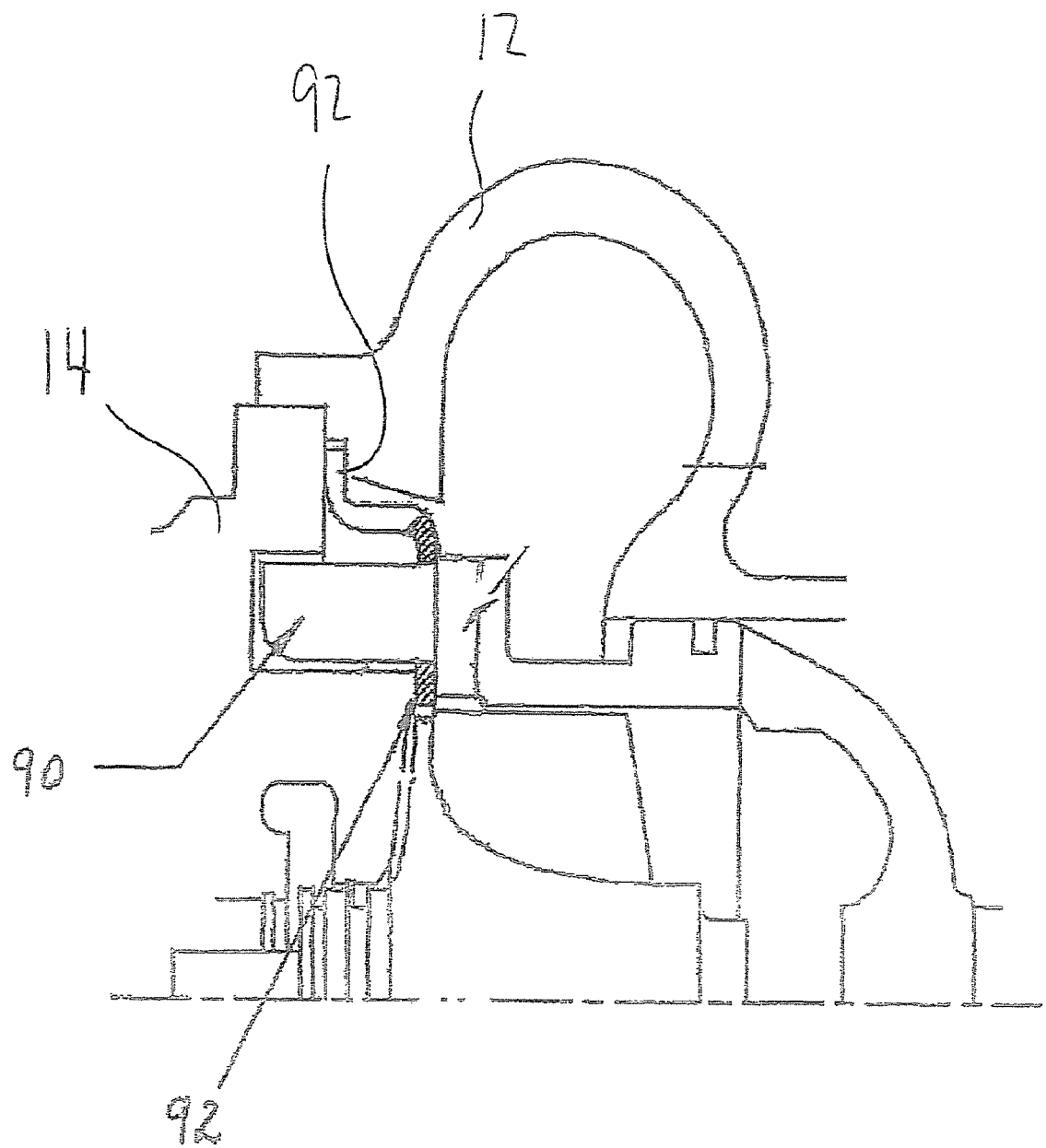
FIG. 2 is an enlarged cross-sectional view of portion A of the turbocharger of FIG. 1 showing a heat shield connection.
Figure 3:
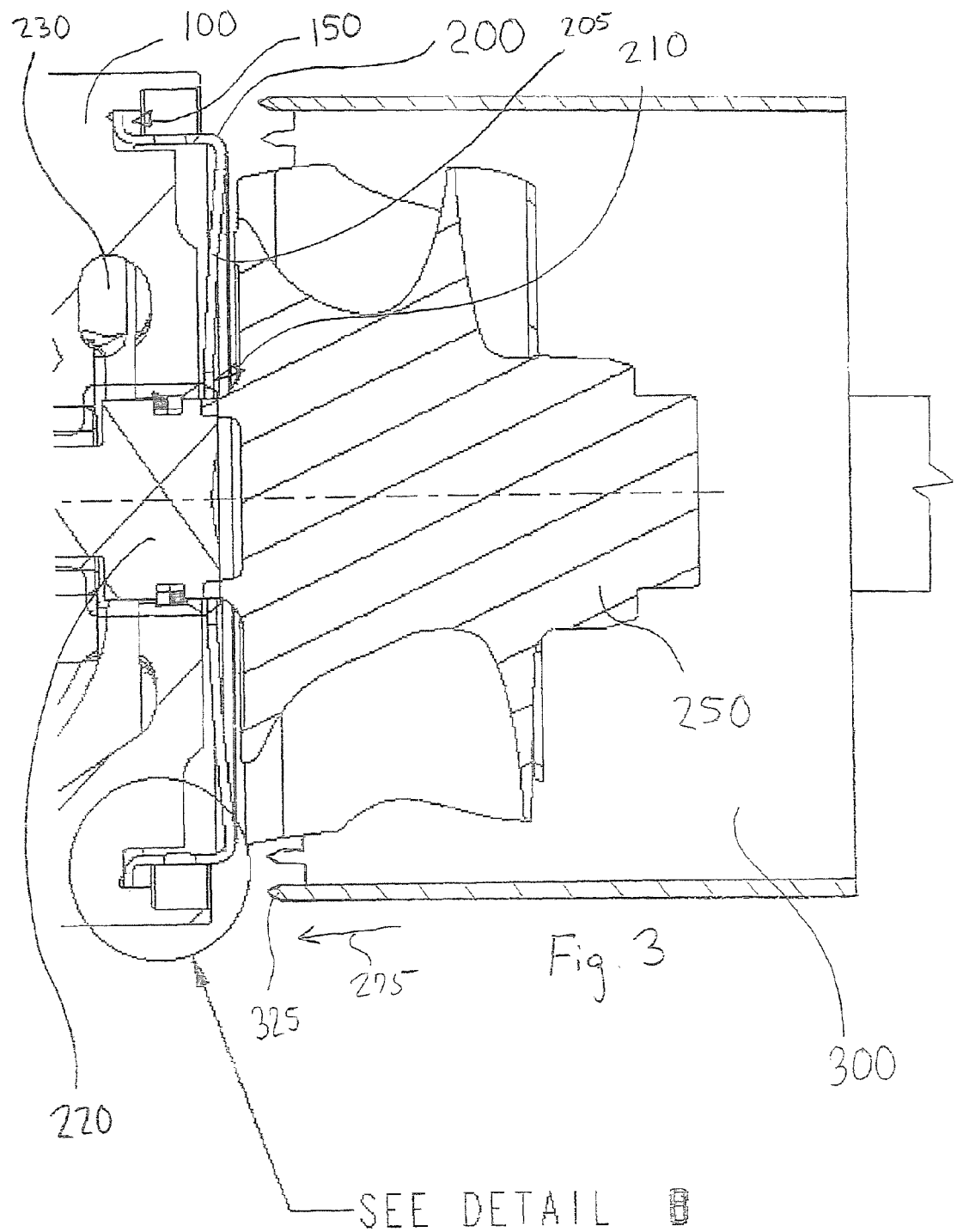
FIG. 3 is a cross-sectional view of a portion of a turbocharger of an exemplary embodiment of the present invention.
Figure 4:
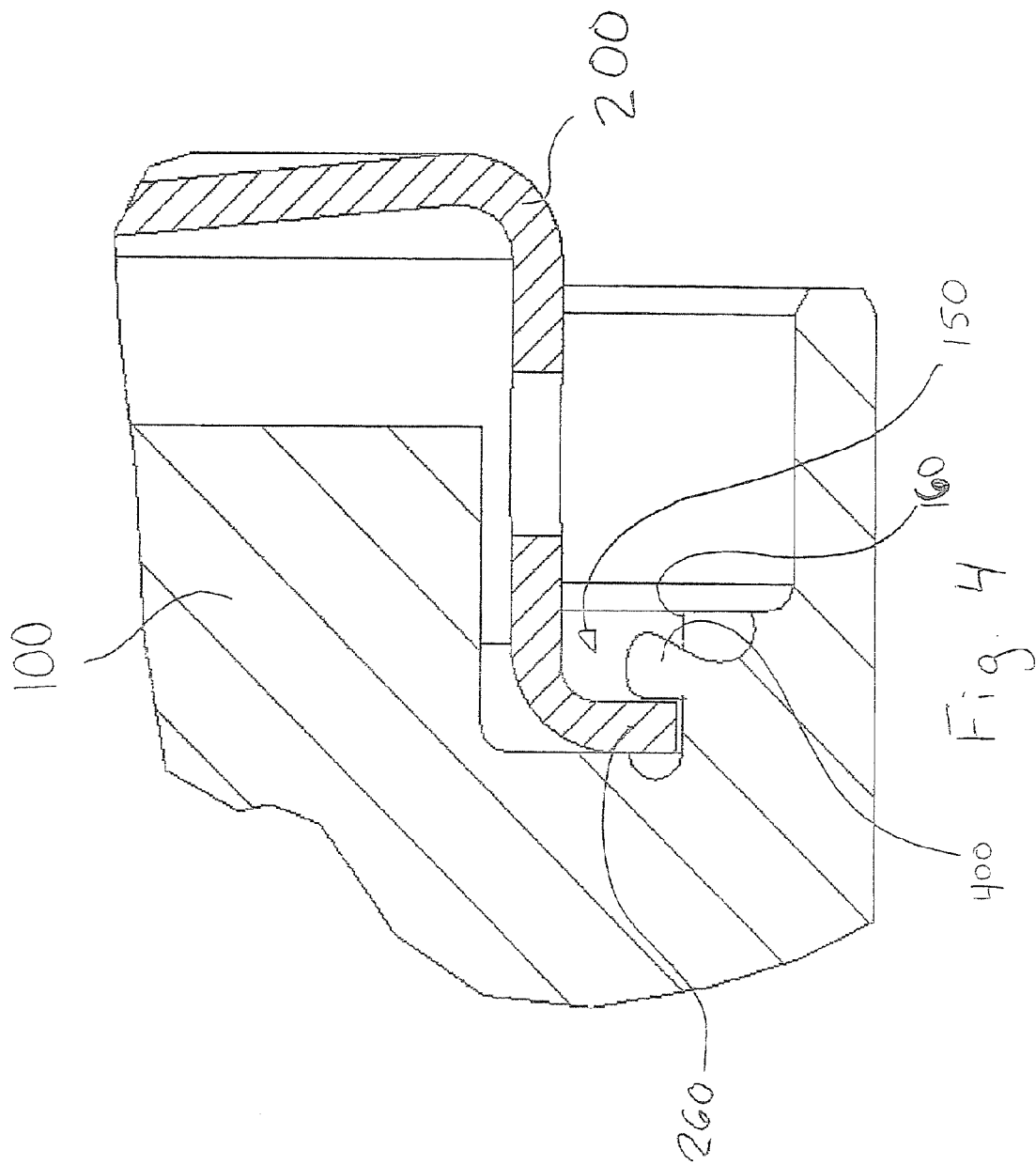
FIG. 4 is an enlarged cross-sectional view of position B of the turbocharger of FIG. 3.

Referring to FIGS. 3 and 4, a portion of a turbocharger is shown with a bearing housing 100. The bearing housing 100 defines a circumferential channel or pocket 150 at one end in proximity to the outer periphery of the bearing housing. As will be explained in more detail later, the channel 150 is used for positioning and connecting of a heat shield 200 to the bearing housing 100.

The channel 150 is preferably concentrically aligned with a turbine wheel or rotor 250. The heat shield 200 has a center hole 210 therethrough. The center hole 210 is preferably concentrically aligned with the turbine wheel 250 and allows for passage of a shaft 220 therethrough. The shaft 220 is connected at an opposite end to a compressor wheel (not shown).

The heat shield 200 provides thermal protection for components of the turbocharger including the lubrication system 230. Various other components are usable with the turbocharger of this exemplary embodiment, but which have not been described. Such other components, include, but are not limited to, a turbine housing, an outer guiding grid of guide vanes, a support ring, an actuation device, and a control housing.

In order to maintain the heat shield 200 securely in position with respect to the bearing housing 100, one or more portions of the bearing housing are deformed and pressed against the heat shield. The particular tool used for the deformation process can be chosen to facilitate manufacture, while providing sufficient strength for the connection between the bearing housing 100 and the heat shield 200, which will be subjected to the harsh environment of the turbocharger.

In the exemplary embodiment of FIGS. 3 and 4, a staking tool 300 is used for deforming the bearing housing 100 and creating one or more connecting projections 400. The size, shape and number of the connecting projections 400 can be chosen to facilitate the process, provide sufficient strength to the connection between the heat shield 200 and the bearing housing 100, and based on other factors including time and cost of manufacture. The present disclosure contemplates the use of a plurality of connecting projections 400 that are equally spaced apart along the circumference of the heat shield 200 so that the loads are equally or substantially equally distributed amongst the projections. However, other configurations of connecting projections 400 are also contemplated by the present disclosure, including a single connecting projection 400 that is a flange circumscribing the entire heat shield 200 and pressed against the heat shield. The number, shape, size, spacing and/or configuration of the connecting projections 400 can be controlled by the particular staking tool 300 that is utilized to form the projections.

As shown in the enlarged view of FIG. 4, the one or more connecting projections 400 are preferably formed along the outer edge 160 of the channel 150. By deforming the bearing housing 100 along this edge 160, the deformation process is facilitated. Preferably, the size and shape of the channel 150 is within a tight tolerance of the size and shape of the outer periphery of the heat shield 200. More preferably, the heat shield 200 has a flange 260 with a size and shape that is similar to the size and shape of the channel 150 so that the heat shield can be inserted into the channel and temporarily held there during the stalking process. However, other shapes and sizes of the outer periphery of the heat shield 200 are contemplated by the present disclosure, with or without a flange 260. Additionally, the exemplary embodiment has a heat shield 200 with an inner wall 205 that tapers towards the center hole 210 to provide a concave surface of the heat shield. However, the present disclosure contemplates other shapes of the heat shield 200 including cylindrical.

The channel 150 is preferably an annular channel having a uniform depth and width that corresponds substantially to the flange 260 of the heat shield 200. By providing such a uniform channel 150, the orientation of the heat shield 200 with respect to the channel 150 does not matter during the staking process as described below. However, the present disclosure also contemplates other shapes for the channel 150, which would correspond to the shape of the heat shield 200, including keys or the like in the channel that could orient the heat shield in a desired orientation.

In an exemplary embodiment, the deformation process begins with insertion of the flange 160 of the heat shield 200 into the channel 150. Due to the tight tolerances, the heat shield 200 can be press-fit therein while the staking tool 300 is being positioned. The staking tool 300 is positioned against the edge 160 and a compressive force is applied to the tool resulting in formation of the connecting projections 400 via the compression stakes 325. In a preferred embodiment, the staking tool 300 needs only to move in a direction towards the bearing housing 100 to form the connecting projections 400. However, the present disclosure contemplates other techniques and types of staking tools, such as, for example, a staking tool that compresses and rotates.

Typically, the bearing housing 200 is made from cast iron and more typically grey cast iron, which can be readily deformed by the staking tool 300. Other techniques can be used in combination with the process described above, including the addition of heat to facilitate the process.

While the present disclosure has been described with respect to a turbocharger having variable geometry guide vanes, it should be understood that the exemplary embodiment of the heat shield assembly and the process of assembly can be used with other types of turbochargers.

While the invention has been described by reference to a specific embodiment chosen for purposes of illustration, it should be apparent that numerous modifications could be made thereto by those skilled in the art without departing from the spirit and scope of the invention.

The invention claimed is:

1. A turbocharger comprising:
    a bearing housing (100);
    a shaft (220) mounted for rotation in said bearing housing;
    with a lubrication system (230) for directing flow of lubricant to said shaft in said bearing housing;
    a turbine wheel (250) attached to one end of said shaft and adapted to be driven by exhaust gas flow; and
    a heat shield (200) isolating the lubrication system (230) from the turbine wheel (250),
    wherein the heat shield (200) is connected to the bearing housing (100) by at least one connecting projection (400), and wherein the at least one connecting projection (400) is defined by a deformed portion of the bearing housing (100).

2. The turbocharger of claim 1, wherein the bearing housing (100) has a recess (150) dimensioned for receiving said heat shield (200), and wherein at least a portion of the heat shield (200) is positioned in the recess (150).

3. The turbocharger of claim 2, wherein the heat shield (200) press fittingly engages said recess (150).

4. The turbocharger of claim 2, wherein the recess is bordered by a lip, and wherein the at least one connecting projection (400) is formed from a deformation at the lip (160) of the recess (150).

5. The turbocharger of claim 1, wherein the at least one connecting projection (400) is formed by a staking tool (300) having one or more compression stakes (325) thereon.

6. A method of assembling a turbocharger comprising:
    positioning a heat shield (200) against a bearing housing (100) such that following final assembly said heat shield will be positioned between the bearing housing and a turbine wheel (250); and
    deforming at least one portion of the bearing housing (100) thereby forming at least one connecting projection (400) pressing against the heat shield (200).

7. The method of claim 6, wherein the deforming is by compression staking, and wherein said compression staking is performed by a staking tool (300) having a plurality of compression stakes (325) to form the at least one connecting projection (400).

8. The method of claim 7, further comprising press-fitting the heat shield (200) into an annular recess (150) of the bearing housing (100) prior to the compression staking of the bearing housing (100).

9. The method of claim 8, wherein the at least one connecting projection (400) is a plurality of connecting projections (400).

* * * * *